US012284741B2

(12) United States Patent
Wang et al.

(10) Patent No.: US 12,284,741 B2
(45) Date of Patent: Apr. 22, 2025

(54) LIGHT CONTROL DEVICE, LIGHT CONTROL METHOD AND SERVER THEREOF

(71) Applicant: Wistron Corporation, New Taipei (TW)

(72) Inventors: Chin Tsan Wang, New Taipei (TW); Yu Chang Liu, New Taipei (TW); Po Cheng Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 429 days.

(21) Appl. No.: 17/967,910

(22) Filed: Oct. 18, 2022

(65) Prior Publication Data

US 2024/0057240 A1 Feb. 15, 2024

(30) Foreign Application Priority Data

Aug. 11, 2022 (TW) ................................ 111130145

(51) Int. Cl.
*H05B 47/175* (2020.01)

(52) U.S. Cl.
CPC .................................. *H05B 47/175* (2020.01)

(58) Field of Classification Search
CPC .................................................... H05B 47/175
See application file for complete search history.

(56) References Cited

U.S. PATENT DOCUMENTS

| | | | | |
|---|---|---|---|---|
| 10,552,120 | B1 * | 2/2020 | Vakili | H04L 9/0852 |
| 11,121,903 | B2 * | 9/2021 | Torbatian | H04L 27/362 |
| 2008/0042659 | A1 * | 2/2008 | Izumi | H04L 25/061 324/650 |
| 2018/0039541 | A1 * | 2/2018 | Hahn | G06F 3/065 |

FOREIGN PATENT DOCUMENTS

| | | |
|---|---|---|
| CN | 109857622 | 6/2019 |
| CN | 112069766 | 12/2020 |

OTHER PUBLICATIONS

"Office Action of Taiwan Counterpart Application", issued on Feb. 22, 2023, p. 1-p. 10.

* cited by examiner

*Primary Examiner* — Minh D A
(74) *Attorney, Agent, or Firm* — JCIPRNET

(57) ABSTRACT

A light control device, a control method, and a server thereof are provided. The light control device includes a first controller and a second controller. The first controller is disposed on a first circuit board. The first controller is coupled to a selected signal source of multiple signal sources, re-encodes a received control signal, and transmits an encoded control signal through a transmission interface. The second controller is disposed on a second circuit board. The second controller decodes the encoded control signal to generate multiple driving signals. The driving signals are respectively for driving and controlling lighting statuses of multiple lighting components.

20 Claims, 5 Drawing Sheets

LIGHT CONTROL DEVICE, LIGHT CONTROL METHOD AND SERVER THEREOF

CROSS-REFERENCE TO RELATED APPLICATION

This application claims the priority benefit of Taiwan application serial no. 111130145, filed on Aug. 11, 2022. The entirety of the above-mentioned patent application is hereby incorporated by reference herein and made a part of this specification.

BACKGROUND

Technical Field

The disclosure relates to a light control device, a light control method, and a server thereof, and in particular relates to a light control device, a light control method, and a server thereof that may reduce resource requirements for main board controllers.

Description of Related Art

In today's servers, for the diversity and flexibility of the system, there are a variety of storage devices from different sources in the server. Therefore, in the light control mechanism of the storage device, the server must decode the control signal and control the light status of the storage device according to different configurations.

Under the premise of space constraints in the system, the selection of controllers and connectors on the server are limited. Especially in the multi-node server architecture, the aspects of its influence include: the pin configuration of the controller and the connector requires a lot of usage; the processing resources of the controller are heavily occupied; in addition, the signals of the storage devices from various sources may cause the signal lines of a circuit board to be crowded in the layout.

SUMMARY

The disclosure provides a server and a light control device thereof, which may reduce the resource of the controller on the backplane from being occupied and reduce the complexity of the circuit layout of the microcontroller on the backplane.

An embodiment of the disclosure provides a light control device, which includes a first controller and a second controller. The first controller is disposed on the first circuit board. The first controller is coupled to a selected signal source of multiple signal sources to re-encode a control signal that is received, and transmits an encoded control signal through a transmission interface. The second controller is disposed on a second circuit board, and is coupled to the first controller through the transmission interface. The second controller is coupled to multiple light-emitting components to decode the encoded control signals and generate multiple driving signals. The driving signals respectively drive and control lighting statuses of the light-emitting components.

An embodiment of the disclosure provides a light control method, which includes the following process. A first controller is disposed on a first circuit board, so that the first controller receives and re-encodes a control signal through a selected signal source to generate an encoded control signal. The encoded control signal is transmitted to a second circuit board through a transmission interface. A second controller is disposed on the second circuit board, so that the second controller decodes the encoded control signal to generate multiple driving signals respectively corresponding to multiple light-emitting components. Lighting statuses of the light-emitting components are respectively driven and controlled according to the driving signals.

An embodiment of the disclosure provides a server, which includes at least one storage device, multiple light-emitting components, and a light control device. The light control device includes a first controller and a second controller. The first controller is disposed on the first circuit board. The first controller is coupled to a selected signal source of multiple signal sources to re-encode a control signal that is received, and transmits an encoded control signal through a transmission interface. The second controller is disposed on a second circuit board, and is coupled to the first controller through the transmission interface. The second controller is coupled to the at least one storage device and the light-emitting components to decode the encoded control signal and generate multiple corresponding driving signals. The driving signals respectively drive and control lighting statuses of the light-emitting components.

Based on the above, the light control device of the disclosure decodes the encoded control signal transmitted by the first controller through the second controller on the second circuit board, and thereby generates a driving signal to drive and control the lighting statuses of the light-emitting components. In this way, the resource usage of the second controller on the second circuit board may be reduced, and the complexity of the circuit layout on the second circuit board may be reduced.

DETAILED DESCRIPTION OF DISCLOSED EMBODIMENTS

Figure 1:
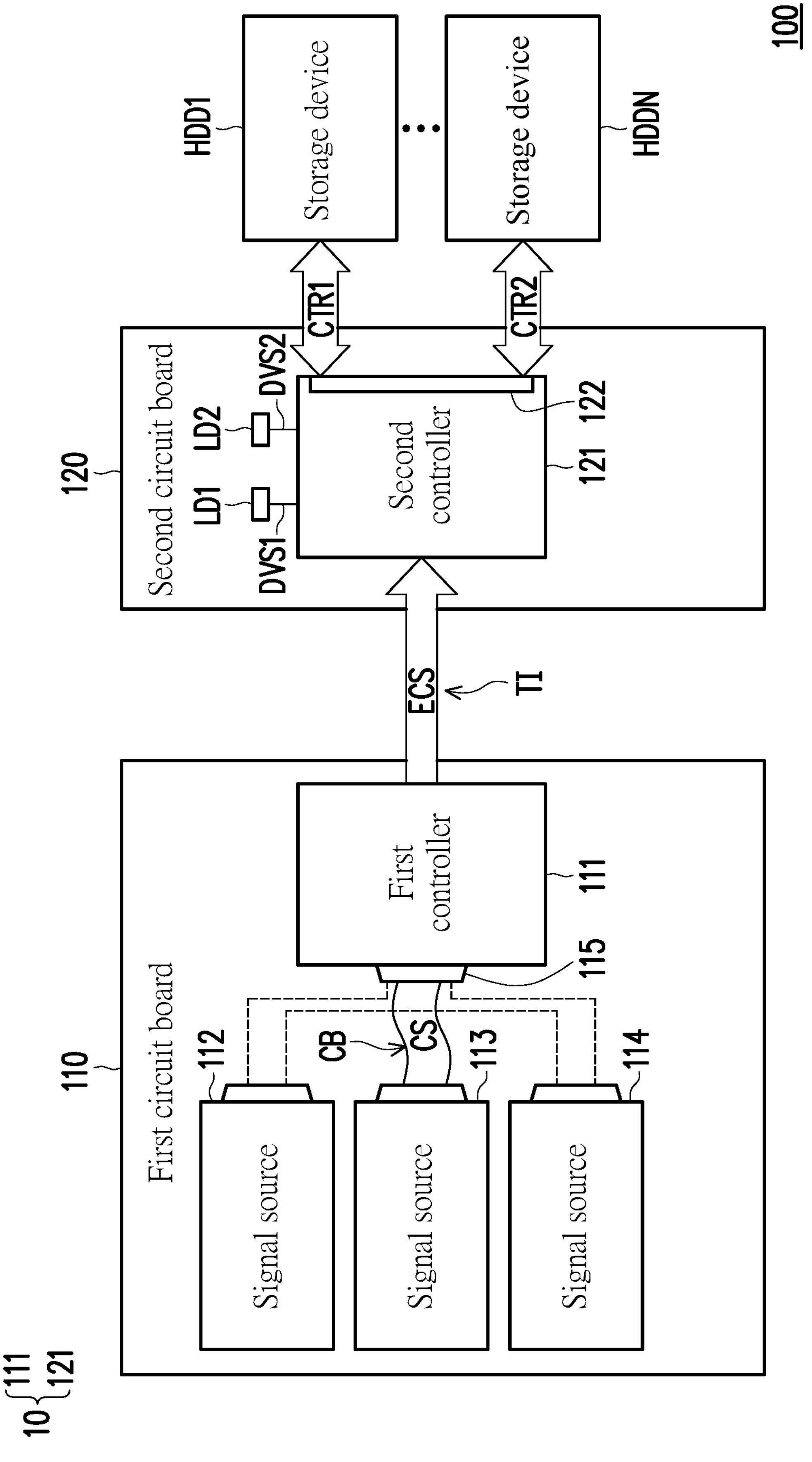
FIG. 1 is a schematic diagram of a server according to an embodiment of the disclosure.

Referring to FIG. 1, FIG. 1 is a schematic diagram of a server according to an embodiment of the disclosure. A server 100 includes storage devices HDD1 to HDDN, light-emitting components LD1 and LD2, and a light control device 10. The server 100 may be a rack server, a tower server, or a multi-node server. The light control device 10 includes a first controller 111 and a second controller 121. The first controller 111 is disposed on a first circuit board 110, and the second controller 121 is disposed on a second circuit board 120. Multiple signal sources 112 to 114 may be disposed on the first circuit board 110. An input/output (I/O) interface 115 of the first controller 111 may be coupled to a selected signal source (e.g., the signal source 113) of the signal sources 112 to 114 through a bus cable CB.

The first controller 111 is coupled to the second controller 121 through a transmission interface TI. The second controller 121 is further coupled to the light-emitting components LD1 and LD2, and one or more storage devices HDD1 to HDDN. The storage devices HDD1 to HDDN may be any form of disk drive, such as an embedded non-volatile memory (NVM-e) drive, a serial attached small computer systems interface (SAS) drive, or a serial advanced technology attachment (SATA) drive.

In terms of operation details, the signal source 113 transmits a control signal CS to the first controller 111 through the bus cable CB. The first controller 111 may re-encode the control signal CS, and may generate an encoded control signal ECS. In detail, the first controller 111 may perform a demodulation operation to the control signal CS, and then re-encode the demodulated control signal CS to generate the encoded control signal ECS. The first controller 111 then transmits the encoded control signal ECS to the second controller 121 through the transmission interface TI. In an embodiment, the transmission interface TI may be an inner integrated circuit ($I^2C$) transmission interface.

The second controller 121 may decode the received encoded control signal ECS, thereby generating multiple driving signals DVS1 and DVS2. The second controller 121 may respectively drive the light-emitting components LD1 and LD2 through the driving signals DVS1 and DVS2, and may control the lighting status of each of the light-emitting components LD1 and LD2.

In an embodiment, the second controller 121 also performs sending and receiving operations of control signals CTR1 and CTR2 with the storage devices HDD1 to HDDN. The second controller 121 may determine the types of the storage devices HDD1 to HDDN through the initialization operation of the input/output interface 122 (e.g., a general purpose input/output (GPIO) interface).

In an embodiment, the first circuit board 110 may be a main board, and the second circuit board 120 may be a backplane. The light control operation of the light-emitting components LD1 and LD2 may be controlled by the second controller 121 of the second circuit board 120, which may reduce the resource requirements of the first controller 111. In addition, in an embodiment, the first controller 111 is connected to the selected signal source through the bus cable CB, and then transmits the encoded control signal ECS to the second controller 121 through the transmission interface TI, so that the second circuit board 120 does not need to respectively dispose the separate connecting wires with all the signal sources 112 to 114, which may effectively reduce the number of pins of the second circuit board 120 and reduce the complexity of the wiring on the second circuit board 120.

Figure 2:
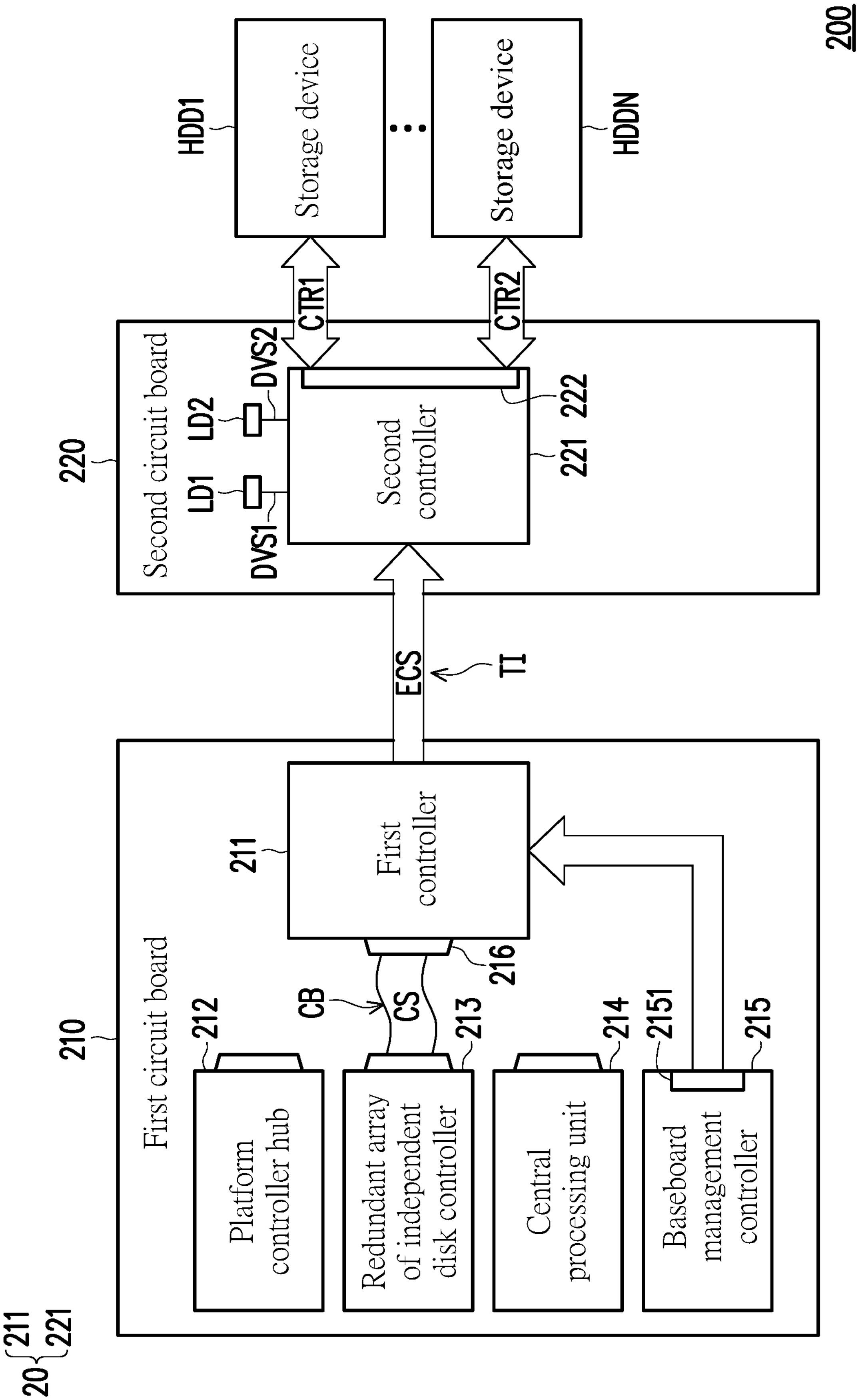
FIG. 2 is a schematic diagram of a server according to another embodiment of the disclosure.

Referring to FIG. 2, FIG. 2 is a schematic diagram of a server according to another embodiment of the disclosure. A server 200 includes storage devices HDD1 to HDDN, light-emitting components LD1 and LD2, and a light control device 20. The light control device 20 includes a first controller 211 and a second controller 221. The first controller 211 is disposed on a first circuit board 210, and the second controller 221 is disposed on a second circuit board 220. The first circuit board 210 may include a platform controller hub (PCH) 212, a redundant array of independent disk controller (RAID controller) 213, and a central processing unit (CPU) 214. The platform controller hub 212, the RAID controller 213, and the central processing unit 214 may be multiple signal sources, which send the control signal CS to execute the light control operation.

The first circuit board 210 further includes a baseboard management controller (BMC) 215. The baseboard management controller 215 is coupled to the first controller 211. The baseboard management controller 215 may be used to monitor the first controller 211 of the first circuit board 210 (main board), and the second controller 221 of the second circuit board 220 (backplane) may be monitored through the first controller 211 of the first circuit board 210.

An input/output interface 216 of the first controller 211 may be coupled to one of the platform controller hub 212, the RAID controller 213, and the central processing unit 214 through the bus cable CB. In FIG. 2, the first controller 211 is coupled to the RAID controller 213 through the bus cable CB.

The first controller 211 is coupled to the second controller 221 through the transmission interface TI. The second controller 221 is further coupled to the storage devices HDD1 to HDDN and the light-emitting components LD1 and LD2.

Regarding the operation details of the light control, when the server 200 enters a standby status, the second controller 221 may determine the type of the selected storage devices HDD1 to HDDN through the initialization operation of the input/output interface 222 (e.g., GPIO) of the second controller 221. In detail, the second controller 221 may determine the type of the selected storage devices HDD1 to HDDN through the logic values of the signals received by the corresponding storage devices HDD1 to HDDN on multiple specific pins, the corresponding relationship may be shown in the following table:

| | Signal of storage device | | | Temporary value of |
|---|---|---|---|---|
| Type | First pin | Second pin | Third pin | second controller |
| SAS | Low logic | Low logic | Low logic | 000 |
| SATA | Low logic | Low logic | High logic | 001 |
| NVM-e | High logic | Low logic | Low logic | 100 |
| | High logic | Low logic | High logic | 101 |

The first pin in the table above may be a PRSNT #pin, a IfDet #pin, and a SAS #pin.

Next, the baseboard management controller 215 may determine whether the first controller 211 is coupled to the RAID controller 213 through the initialization operation of the input/output interface 2151 (e.g., GPIO) of the baseboard management controller 215. When the baseboard management controller 215 determines that the first controller 211 is coupled to the RAID controller 213, the baseboard management controller 215 may control a data transmission mode of the RAID controller 213 to be a universal backplane management (UBM) mode or a serial general purpose input/output (Serial GPIO, SGPIO) mode. The baseboard management controller 215 may pull down specific pins on the first controller 211 and the RAID controller 213 to set the data transmission mode to be the serial GPIO mode, or the above-mentioned specific pins may set the data transmission mode as the backplane management mode through a pull up operation executed by the first circuit board 210.

Similarly, in the standby mode, the first controller 211 may determine that the coupled signal source is the RAID controller 213, the platform controller hub 212, or the central processing unit 214 through the initialization operation of the input/output interface 216 (e.g., GPIO) of the first controller 211. In detail, the first controller 211 may determine according to the logic values of the two pins on the GPIO, for example, that the logic value 00 indicates that the signal source is the platform controller hub 212; the logical value 01 indicates that the signal source is the RAID controller 213 (or a hardware disk array (Raid Card)); the logic value 10 indicates that the signal source is the central processing unit 214.

Next, the server 200 may enter a power-on status. In the power-on status, the first controller 211 may determine that the format of the control signal CS to be decoded is a universal backplane management mode signal, a serial general purpose input/output mode signal, or a virtual pin port (VPP) signal through the initialization operation of the input/output interface 216 (e.g., GPIO) of the first controller 211. The first controller 211 decodes the control signal CS, and encodes the decoded control signal into an encoded control signal ECS of the inner integrated circuit signal. Through the transmission interface TI, the first controller 211 may transmit the encoded control signal ECS to the second controller 221.

The second controller 221 may decode the encoded control signal ECS, and may generate the driving signals DVS1 and DVS2 according to the successfully decoded signals. The second controller 221 respectively provides the driving signals DVS1 and DVS2 to the light-emitting components LD1 and LD2. The second controller 221 may respectively control the lighting statuses of the light-emitting components LD1 and LD2 through the driving signals DVS1 and DVS2. The light-emitting components LD1 and LD2 may be used to reflect the working status of the storage devices HDD1 to HDDN, for example, to indicate that the storage devices HDD1 to HDDN are working, or to indicate that the storage devices HDD1 to HDDN are abnormal. The light-emitting components LD1 and LD2 may be light-emitting diodes.

It is worth mentioning that, in the server 200, the number of light-emitting components may be any integer. The drawing in FIG. 2 is only an example for description, and is not intended to limit the disclosure.

In an embodiment, the first controller 211 and the second controller 221 may be a programmable system-on-chip (PSoC) or a microcontroller (MCU) without specific limitation.

Figure 3A:
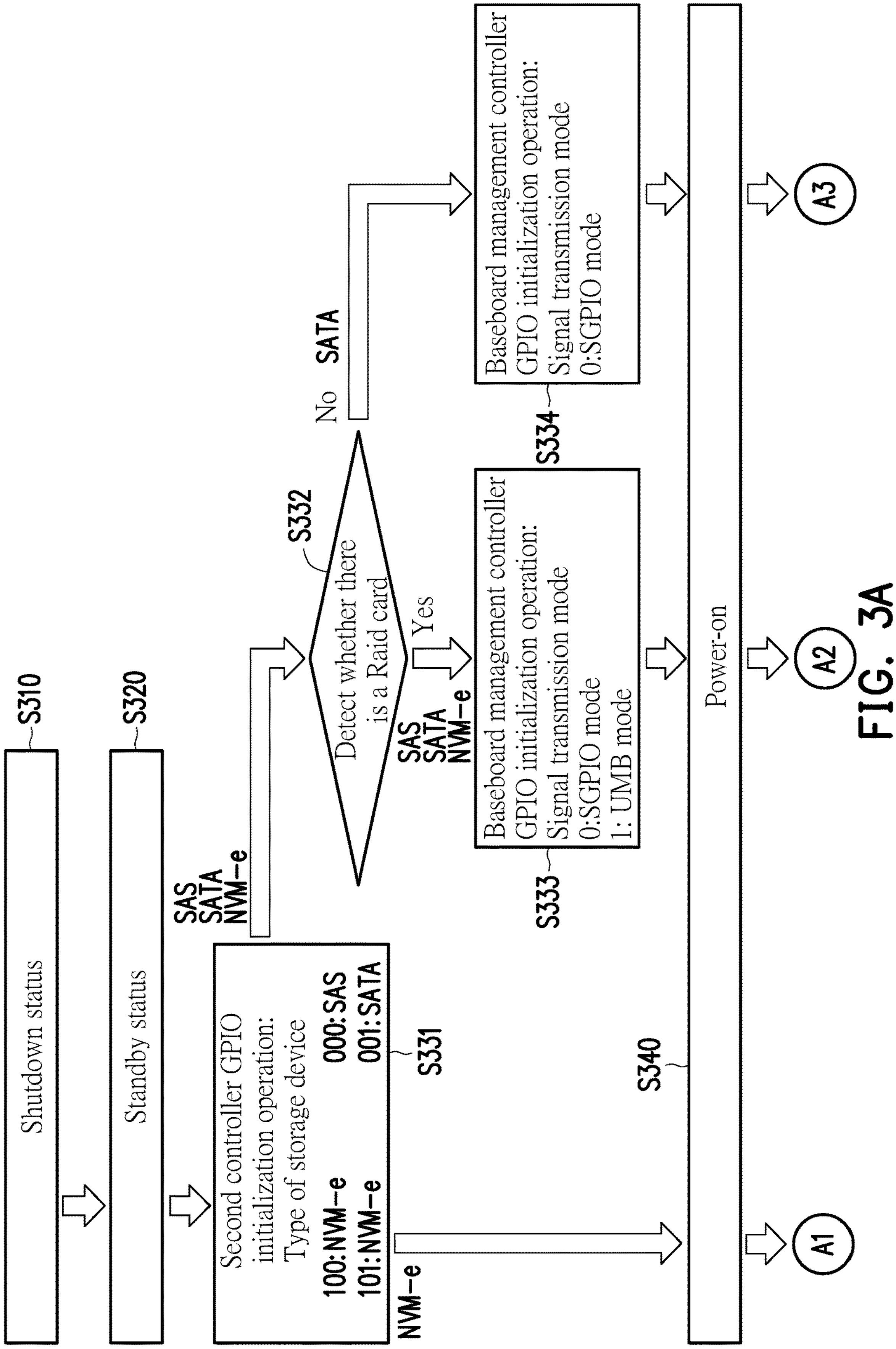
FIG. 3A and FIG. 3B are flowcharts showing a light control operation of a server according to an embodiment of the disclosure.
Figure 3B:
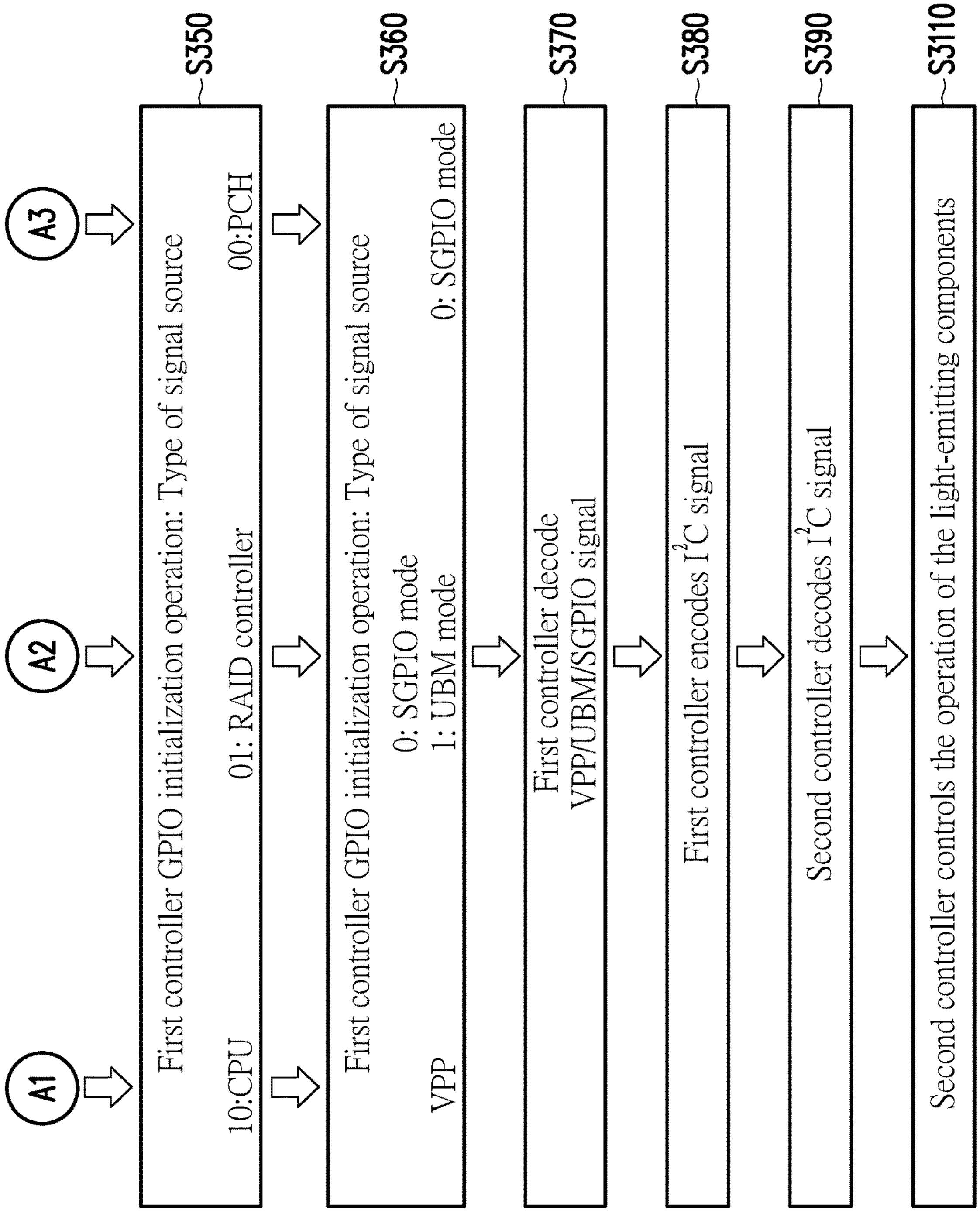

Referring to FIG. 3A and FIG. 3B below, FIG. 3A and FIG. 3B are flowcharts showing a light control operation of a server according to an embodiment of the disclosure. In FIG. 3A, in step S310, the server is in a shutdown status. In step S320, power is supplied to the server, and the server is put into a standby status. In the standby status, in step S331, the second controller detects the type of the selected storage device through the initialization operation of the GPIO of the second controller. The second controller may obtain the type of the selected storage device by detecting the logic value on a specific pin. When the logical value is 100 or 101, the storage device is an embedded non-volatile memory (NVM-e) disk drive; when the logical value is 000, the storage device is a serial attached small computer systems interface (SAS) disk drive; when the logical value is 001, the storage device may be a serial advanced technology attachment (SATA) disk drive.

When the logic value (three bits) of the specific pin detected by the second controller is 100, step S340 may be executed. When the logic value of the specific pin detected by the second controller is 101, 000, or 001, step S332 may be executed.

In step S332, the baseboard management controller may detect whether the signal source has a hard disk array (Raid Card), if so, the selected storage device may be an embedded non-volatile memory disk drive, a serial attached small computer systems interface disk drive, or a serial advanced technology attachment disk drive, and step S333 may be executed; if not, the selected storage device may be a serial advanced technology attachment disk drive, and step S334 may be executed.

In step S333, the baseboard management controller controls the signal transmission mode of the signal source through the initialization operation of the GPIO of the baseboard management controller. When the baseboard management controller sets the signal on a specific pin to logic value 0 through the GPIO of the baseboard management controller, the signal transmission mode of the signal source is the GPIO mode; or when the signal on a specific pin is set to logic value 1, the signal transmission mode of the signal source is the UBM mode.

In addition, in step S334, the baseboard management controller controls the data transmission mode of the signal source to be the SGPIO mode through the initialization operation of the GPIO of the baseboard management controller.

Next, in step S340, the server executes a power-on operation, and respectively corresponds to steps S331, S333, and S334 to respectively enter nodes A1, A2, and A3.

In FIG. 3B, in step S350, the first controller on the main board detects the type of the selected signal source through the initialization operation of the GPIO of the first controller. Respectively corresponding to nodes A1, A2, and A3, according to the logic value on the specific pin, the first controller may determine that the selected signal source is a central processing unit (CPU) when the logic value is 10; the first controller may determine that the selected signal source is a hard disk array (RAID) when the logic value is 01; the first controller may determine that the selected signal source is a platform controller hub (PCH) when the logic value is 00.

In step S360, the first controller on the main board determines the mode of the control signal sent by the signal source through the initialization operation of the GPIO of the first controller. Corresponding to the selected signal source of the central processing unit, the control signal is the virtual pin port signal; corresponding to the selected signal source of the hardware disk array, the control signal is the universal backplane management mode signal or the serial general purpose input/output mode signal; corresponding to the selected signal source of the platform controller hub, the control signal may be the serial general purpose input/output mode signal.

In step S370, the first controller performs the decoding operation of the VPP, UBM, or SGPIO signal to the control signal sent by the signal source according to the determination result of step S360.

Next, in step S380, the first controller performs encoding according to the decoding result of step S370, and generates an encoded control signal which is an inner integrated circuit (I2C) signal.

In step S390, the second controller on the backplane decodes the received encoded control signal which is an inner integrated circuit ($I^2C$) signal, and thereby generates a driving signal. In step S3110, the second controller controls the operation of the light-emitting component through the driving signal, so as to execute the light control operation of the server.

Figure 4:
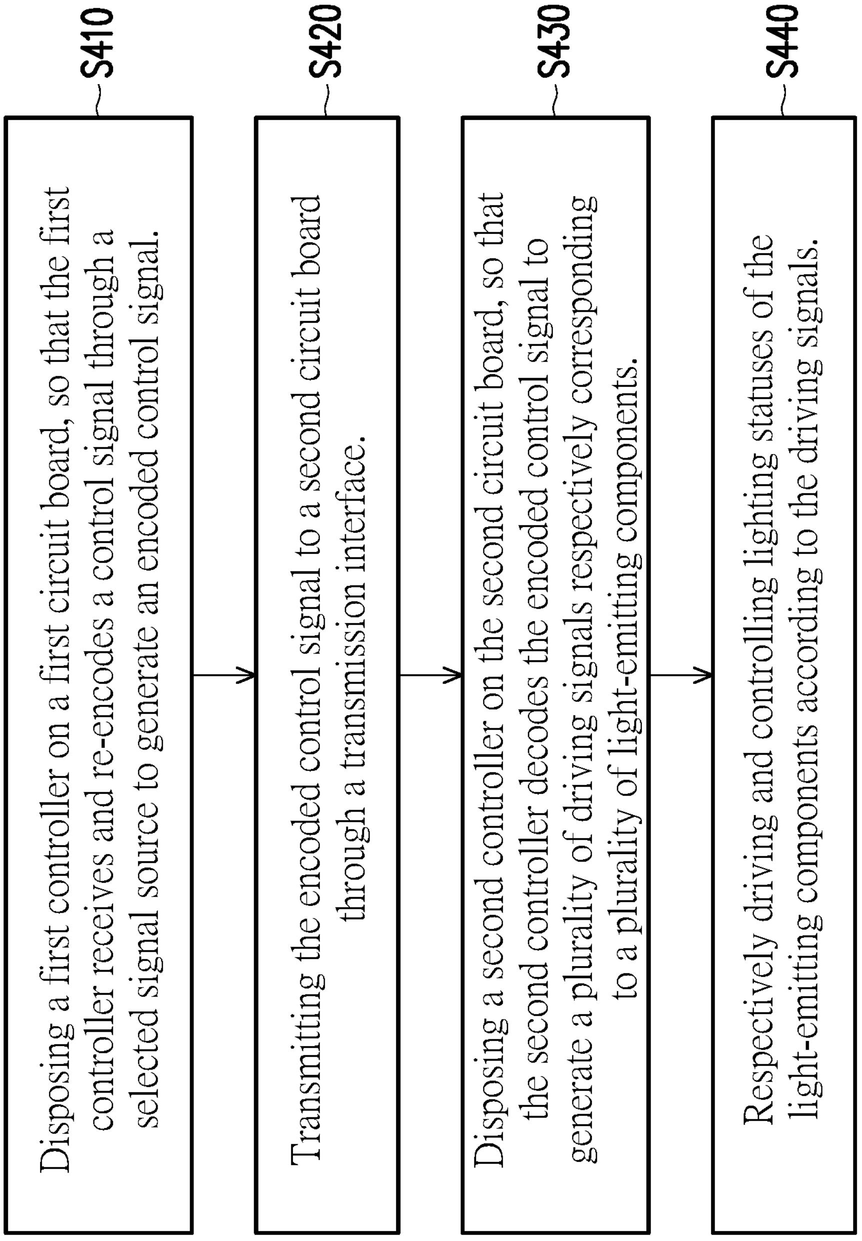
FIG. 4 is a flowchart showing a light control method according to an embodiment of the disclosure.

Referring to FIG. 4, FIG. 4 is a flowchart showing a light control method according to an embodiment of the disclosure. In step S410, the first controller is disposed on the first circuit board, and the first controller receives and re-encodes the control signal through a selected signal source to generate the encoded control signal. In step S420, the encoded control signal is transmitted to the second circuit board through the transmission interface. In step S430, the second controller is disposed on the second circuit board, and the second controller decodes the encoded control signal to generate multiple driving signals respectively corresponding to multiple light-emitting components. In step S440, the lighting statuses of the light-emitting components are respectively driven and controlled according to the driving signal.

The implementation and details of the above steps have been described in detail in the foregoing embodiments, and are not be repeated herein.

To sum up, the disclosure generates the driving signal for controlling the light by disposing the first controller on the main board and decoding the control signal transmitted by the first controller. Thereby, the resource consumption of the second controller on the backplane may be reduced, and the disclosure couples the first controller and the selected signal source through a bus cable, which may effectively reduce the complexity of wiring on the backplane and reduce the number of pins required for the second controller.

What is claimed is:

1. A light control device, comprising:

a first controller, disposed on a first circuit board, wherein the first controller is coupled to a selected signal source of a plurality of signal sources to re-encode a control signal that is received, and transmits an encoded control signal through a transmission interface; and a second controller, disposed on a second circuit board and coupled to the first controller through the transmission interface, wherein the second controller is coupled to a plurality of light-emitting components to decode the encoded control signals and generate a plurality of driving signals, wherein the driving signals respectively drive and control lighting statuses of the light-emitting components.

2. The light control device according to claim 1, wherein the first controller performs a demodulation operation to the control signal, and then performs a re-encoding operation according to the control signal after the demodulation operation.

3. The light control device according to claim 1, wherein the second controller determines a type of at least one storage device through an initialization operation of an input/output interface.

4. The light control device according to claim 3, wherein the type of the at least one storage device is an embedded non-volatile memory drive, a serial attached small computer systems interface (SAS) drive, or a serial advanced technology attachment (SATA) drive.

5. The light control device according to claim 1, further comprising:

a baseboard management controller, disposed on the first circuit board and coupled to the first controller, wherein the baseboard management controller controls a signal transmission mode of the selected signal source through an initialization operation of an input/output interface.

6. The light control device according to claim 5, wherein the signal transmission mode is a universal backplane management (UBM) mode or a serial general purpose input/output (Serial GPIO, SGPIO) mode.

7. The light control device according to claim 1, wherein the first controller determines that the selected signal source is a RAID card, a platform controller hub, or a central processing unit through an initialization operation of an input/output interface.

8. The light control device according to claim 7, wherein the first controller determines that the control signal is a universal backplane management mode signal, a serial general purpose input/output mode signal, or a virtual pin port (VPP) signal through the initialization operation of the input/output interface.

9. The light control device according to claim 1, wherein the encoded control signal is an inner integrated circuit signal.

10. The light control device according to claim 1, wherein the first controller is coupled to the selected signal source through a bus cable.

11. The light control device according to claim 1, wherein the first circuit board is a main board, and the second circuit board is a backplane.

12. A light control method, comprising:

disposing a first controller on a first circuit board, so that the first controller receives and re-encodes a control signal through a selected signal source to generate an encoded control signal;

transmitting the encoded control signal to a second circuit board through a transmission interface;

disposing a second controller on the second circuit board, so that the second controller decodes the encoded control signal to generate a plurality of driving signals respectively corresponding to a plurality of light-emitting components; and respectively driving and controlling lighting statuses of the light-emitting components according to the driving signals.

13. The light control method according to claim 12, further comprising:

performing a demodulation operation with the first controller to the control signal, and then performing a re-encoding operation according to the control signal after the demodulation operation.

14. The light control method according to claim 12, further comprising:

determining a type of at least one storage device with the second controller through an initialization operation of an input/output interface.

15. The light control method according to claim 12, further comprising:

disposing a baseboard management controller on the first circuit board, controlling a signal transmission mode of the selected signal source with the baseboard management controller through an initialization operation of an input/output interface.

16. The light control method according to claim 12, further comprising:

determining with the first controller that the selected signal source is a RAID card, a platform controller hub, or a central processing unit through an initialization operation of an input/output interface.

17. The light control method according to claim 16, further comprising:

determining with the first controller that the control signal is a universal backplane management mode signal, a serial general purpose input/output mode signal, or a virtual pin port (VPP) signal through the initialization operation of the input/output interface.

18. A server, comprising:

at least one storage device;

a plurality of light-emitting components; and a light control device, comprising:

a first controller, disposed on the first circuit board, wherein the first controller is coupled to a selected signal source of a plurality of signal sources to re-encode a control signal that is received, and transmits an encoded control signal through a transmission interface; and a second controller, disposed on a second circuit board coupled to the first controller through the transmission interface, wherein the second controller is coupled to the at least one storage device and the light-emitting components to decode the encoded control signal and generate a plurality of corresponding driving signals, wherein the driving signals respectively drive and control lighting statuses of the light-emitting components.

19. The server according to claim 18, wherein the first controller performs a demodulation operation to the control signal, and then performs a re-encoding operation according to the control signal after the demodulation operation.

20. The server according to claim 18, wherein the light control device further comprising:

a baseboard management controller, disposed on the first circuit board and coupled to the first controller, wherein the baseboard management controller determines whether the selected signal source is a redundant array of independent disk (RAID) controller through an initialization operation of an input/output interface.

* * * * *